H. OLSTAD.
FOOT LEVER FOR GRINDSTONES.
APPLICATION FILED DEC. 27, 1912.

1,144,375.

Patented June 29, 1915.

Witnesses
M. D. Sliger.
D. W. Gould.

Inventor
Hans Olstad
By Victor J. Evans
Attorney

UNITED STATES PATENT OFFICE.

HANS OLSTAD, OF ELSWORTH, NORTH DAKOTA.

FOOT-LEVER FOR GRINDSTONES.

1,144,375.             Specification of Letters Patent.      Patented June 29, 1915.

Application filed December 27, 1912.  Serial No. 738,874.

*To all whom it may concern:*

Be it known that I, HANS OLSTAD, a citizen of the United States, residing at Elsworth, in the county of McKenzie and State of North Dakota, have invented new and useful Improvements in Foot-Levers for Grindstones, of which the following is a specification.

This invention relates to an improved motor for use primarily with grindstones or the like and comprehends construction of a simple device by which the grindstone may be readily and conveniently operated by one or two users.

The main object of the present invention is the provision of a foot power device arranged particularly with relation to the frame of a grindstone and constructed for convenient use by either one or two operators.

The invention in its preferred form of details will be described in the following specification, reference being had to the accompanying drawings, in which:—

Figure 1:
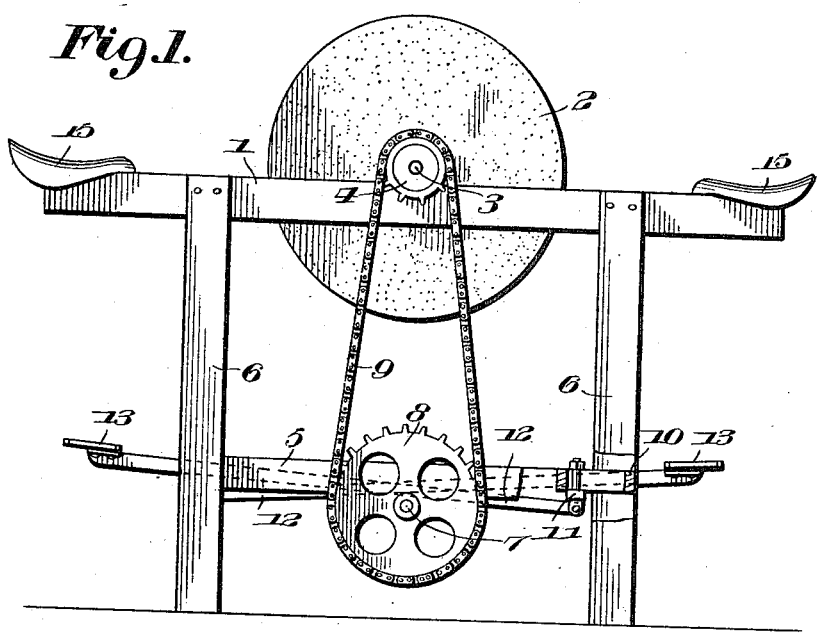
Figure 2:
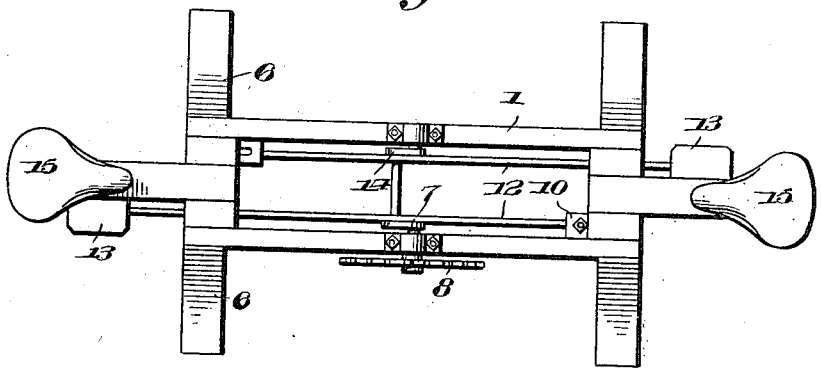

Figure 1 is a view in side elevation of the improved power motor showing the same in use in connection with a grindstone. Fig. 2 is a plan view of the same, the grindstone being omitted.

Referring particularly to the accompanying drawings, the improved motor is shown in connection with a grindstone including a bed frame 1 in which the grindstone 2 is revolubly mounted on a shaft 3. Secured to the shaft at one side of the bed frame is a sprocket wheel 4, and mounted on cross bars 5 of the supports 6 for the bed frame is a second shaft 7 on which is arranged a sprocket 8, connected with the sprocket 4 by a sprocket chain 9.

The respective sprockets 4 and 8 are arranged in vertical alinement, and in the use of the device with a grindstone the sprocket 8 is materially greater in diameter than the sprocket 4 to gain speed, as will be understood.

Secured to the supports 6 on one side of the frame is a stringer 10 and slidably mounted on said stringer at each end thereof is a pivot block 11. The pivot block is limited in its sliding movement in both directions, and may be fixed for sliding movement with relation to the stringer in any desired manner. Pivoted to each pivot block is one end of a foot lever 12, the opposite end of which is formed to present a treadle portion 13. The shaft 7 beyond the sprocket wheel 8 is formed to provide a crank 14 and to the free end of this crank is connected by a pivotal connection the respective levers 12. As previously described, and as seen from the drawings, the respective levers extend in opposite directions, that is, the treadle portions of the levers are disposed adjacent the respective ends of the frame. If desired, the bed plate 1 may be provided at an appropriate point with saddles or seats 15, two such seats being provided one at each end of the frame, the seats being so disposed that the operator can when seated thereon, conveniently reach the treadle portion of the underlying lever.

From the above description it will be obvious that I have provided a means whereby a grindstone may be conveniently operated by either one or two operators and in the latter instance both such operators may use the grindstone for grinding purposes. The movable connection of the pivoted end of the lever permits its necessary longitudinal movement as will be obvious.

While showing and describing the invention as applied to the grindstones it will be obvious that it is readily adapted for other uses of a similar nature and such are contemplated.

What is claimed is:—

A motive power for grindstones including a drive wheel having a crank portion, a frame supporting said wheel, pivot blocks arranged at the opposite ends of the frame and capable of a limited, pivotal, longitudinal movement, levers pivotally connected to the respective pivot blocks and extending therefrom toward each other and connected to the crank, the free ends of the levers being formed to provide treadle portions.

In testimony whereof I affix my signature in presence of two witnesses.

HANS OLSTAD.

Witnesses:
ROBERT NORHEIM,
FRED LARSON.

Copies of this patent may be obtained for five cents each, by addressing the "Commissioner of Patents, Washington, D. C."